J. B. RAY.
SWINGING GATE.
APPLICATION FILED JUNE 12, 1908.
899,472.
Patented Sept. 22, 1908.
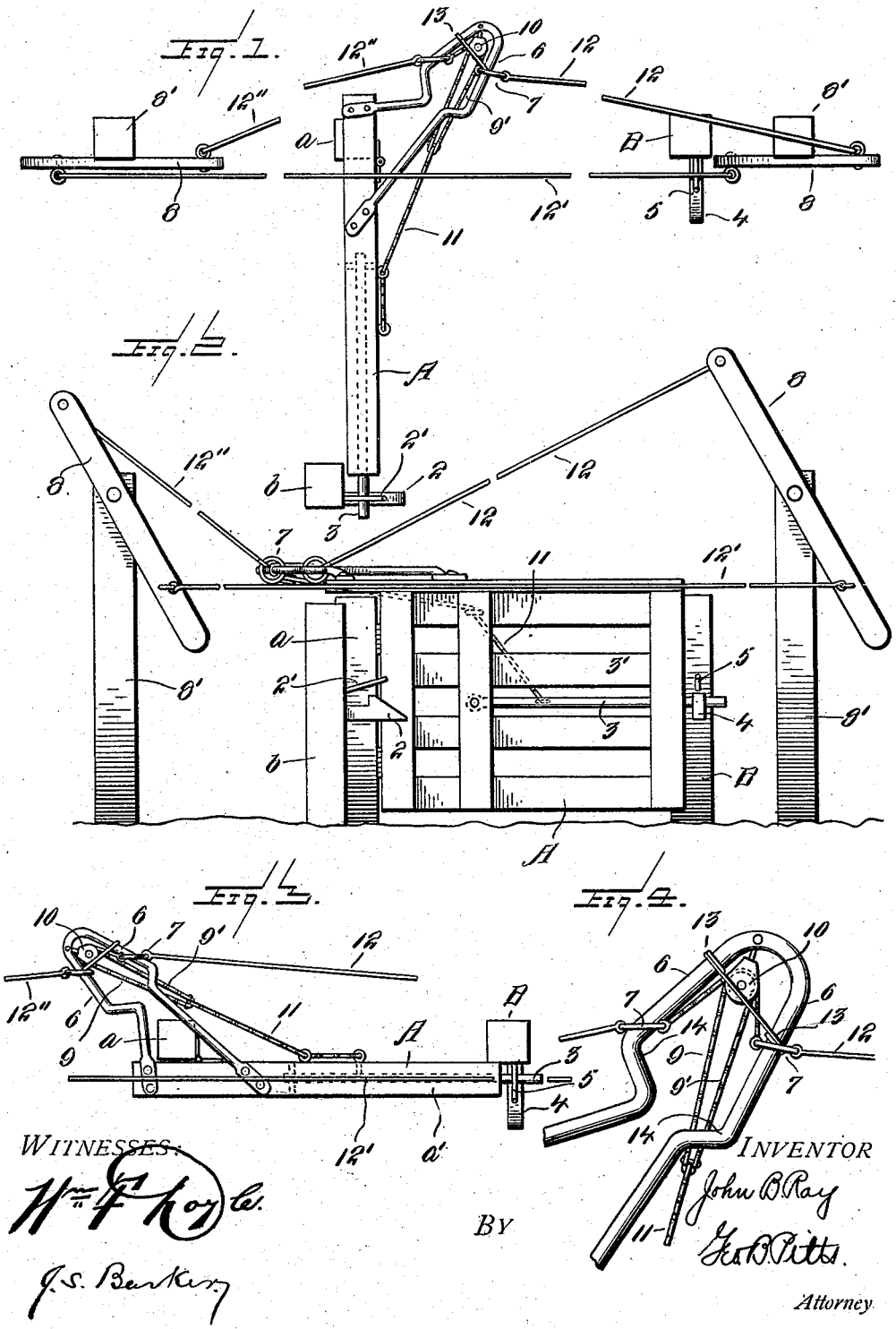
WITNESSES
INVENTOR
John B Ray
BY
Attorney
THE NORRIS PETERS CO., WASHINGTON, D. C.

UNITED STATES PATENT OFFICE.

JOHN B. RAY, OF FLATCREEK, TENNESSEE.

SWINGING GATE.

No. 899,472.  Specification of Letters Patent.  Patented Sept. 22, 1908.

Application filed June 12, 1908. Serial No. 438,107.

*To all whom it may concern:*

Be it known that I, JOHN B. RAY, a citizen of the United States, residing at Flatcreek, in the county of Bedford and State of Tennessee, have invented new and useful Improvements Relating to Swinging Gates, of which the following is a specification.

My invention relates to a swinging gate.

It has for its object to provide an attachment that is connected with the gate frame so as to be moved thereby and adapted to operate the gate positively and quickly.

Another object of the invention is to provide means for accelerating the movement of the gate previous to the end of its movement from one position to another to positively lock it in its open and closed positions.

Referring to the drawings: Figure 1 is a top plan view of a gate embodying my invention. Fig. 2 is an elevation of the gate in open position. Fig. 3 is a top plan view of a portion of the gate in an open position. Fig. 4 is a view of the attachment, detached.

In the drawings, A indicates a swinging gate suitably pivoted to the post $a$.

$b$ is a post provided with a dog or keeper 2 that coöperates with a latch 3, carried by the gate for locking it in closed position.

2' is a deflector mounted above the keeper for directing the latch into the keeper when the gate is closed.

B is a post supported at the side of the road. This post is provided with a keeper 4 and deflector 5, similar to the keeper and deflector of the post $b$ for locking the gate in open position.

6, 6, indicate a pair of guide rods mounted on the gate frame so as to swing therewith and extending to the rear of the pivots upon which it swings. These guides preferably extend at an angle to the gate and are formed of one piece bent into substantially V-shape so that they diverge away from each other. When thus formed, the outer ends of the guides are bent inwardly near their free ends and suitably attached to the gate.

$a'$ indicates a brace or support extending across the top of the gate and forming a base to which the guides 6, 6, are secured.

7 indicates a slide mounted on each of the guides 6.

9 indicates a chain or other suitable means connected to one of the slides and passing around a pulley 10. 9' indicates another chain connected to the other side and also passing around the pulley 10 in an opposite direction. The chains 9, 9', are preferably united into a single chain 11, which is connected at its outer end to the weighted latch 3.

8, 8, indicate a pair of levers suitably mounted on posts 8', 8', on opposite sides of the gate and each provided with a handle whereby it may be oscillated on its pivot. One end of one of the levers is connected by a rod, wire or other means 12 with one of the slides, 7, while the other end of this lever is connected by suitable means 12' with the opposite end of the other lever. This latter lever has its other end connected by suitable means 12'' with the remaining slide 7. By these connections between the levers and the slides, 7, 7, as above described, the operation of one lever in one direction causes the other lever to move on its pivot in an opposite direction, so that the gate may be opened or closed by either lever.

13, 13, indicate stops at one end of the guides, while the inturned portions 14, 14, provide stops for the opposite end thereof.

The operation of the gate may now be stated. When one of the levers is operated, it causes one of the slides, 7, to move on the guide therefor. During the initial movement of the slide, the latch 3 is raised to disengage it from its keeper until it is stopped by a gate panel 3', or other abutment. By the continued operation of the lever, the gate is swung on its hinges, during which movement the slide, that is being operated, moves on the guide from one end thereof to the other. After the gate has swung to a position substantially midway between its open and closed positions, the guides, which have moved therewith, occupy a position inclined relative to the direction of pull of the lever. When the guides reach this position, the slide readily moves toward the far end of the guide, thus causing the gate to accelerate its speed and shut with such momentum as to force the latch into locked position behind its keeper.

When the gate is operated in the opposite direction, the other slide operates in the same manner.

What I claim is:

1. The combination with the swinging gate, of a pair of guides mounted thereon, slides movable on the guides, connections between the slides and the said gate, and means on one side of the gate, connected with the slides, for operating the gate, substantially as set forth.

2. The combination with the swinging gate, of a pair of guides mounted thereon so as to change their position by the movement of the gate, slides movable on the guides, a pivoted latch and keeper, connections between the slides and latch, and means connected with the slides for operating the gate, substantially as set forth.

3. The combination with the swinging gate, of a pair of guides adapted to be moved by the movement of the gate, a slide movable on each guide, connections between the slides and the said gate, a lever, and connections between the lever and the slides for operating the gate, substantially as set forth.

4. The combination with a gate, of a pair of guides inclined relative to the gate frame and arranged to change their position by the movement of the gate, a slide for each guide, connections between the slides and the gate, a lever, and connections between the lever and the slides for operating the latter to open and close the gate, substantially as set forth.

5. The combination with a swinging gate, of guides extending rearward of the pivots upon which the gate swings and arranged to swing by the swinging movement of the gate, a pulley interposed between the slides, connections between the slides and the gate, the said connections passing around the said pulley, levers pivotally mounted on opposite sides of the gate, and connections between the levers and the slides, substantially as set forth.

6. The combination with the swinging gate, of guides mounted thereon, a pulley interposed between the guides, a slide movable on each guide, a pivoted latch carried by the gate, connections passing around the pulley between the latch and the slides, levers mounted on opposite sides of the gate, connections between the levers and the slides, and stops at the opposite ends of the guides for limiting the movement of the slides thereon, substantially as set forth.

7. The combination with a pair of posts, a gate pivoted to one post and provided with a latch, and a keeper secured to the other post, of guides movable with the gate, a slide for each guide, connections between the slides and the latch, means for operating the slides, and a deflector for causing the latch to engage the keeper when the gate is closed, substantially as set forth.

8. The combination with the swinging gate, of a pair of guides mounted thereon so as to change their position by the movement of the gate, means slidable on the guides, a pivoted latch and keeper, connections between the slidable means and latch, and means connected with the said slidable means for operating the gate, substantially as set forth.

JOHN B. RAY.

Witnesses:
C. E. LOGAN,
J. F. STONE.